Dec. 17, 1957  W. H. GOMEZ  2,816,444
PRESSURE SENSITIVE APPARATUS
Filed Nov. 15, 1954  2 Sheets-Sheet 1

INVENTOR.
WILLIAM H. GOMEZ
BY
Tyler S Roundy
ATTORNEY

Dec. 17, 1957 W. H. GOMEZ 2,816,444
PRESSURE SENSITIVE APPARATUS

Filed Nov. 15, 1954 2 Sheets-Sheet 2

INVENTOR.
WILLIAM H. GOMEZ
BY
Tyler & Roundy
ATTORNEY

United States Patent Office 2,816,444
Patented Dec. 17, 1957

2,816,444

PRESSURE SENSITIVE APPARATUS

William H. Gomez, Ridgefield Park, N. J., assignor to Bendix Aviation Corporation, Teterboro, N. J., a corporation of Delaware Application November 15, 1954, Serial No. 468,857

3 Claims. (Cl. 73—407)

This invention relates to pressure sensitive apparatus and especially to control or indicating apparatus which employ flexible diaphragm means responsive to the difference in two pressures.

Prior apparatus utilizing a pair of diaphragms, aneroids, bellows or the like to obtain a mechanical displacement which is a function of the difference between two pressures have been limited in use due to the difficulty experienced in producing a desired accurate correspondence between output displacement and pressure difference. In certain prior constructions one or more flexible elements have been coupled between a pair of interconnected bellows to restrain the displacement of the latter in response to the difference in pressure of the fluids applied to the two bellows. However, in such constructions the restraining springs produce a non-linear loading of the convolutions of the bellows so that the effective displacement axis or center of rotation or pivot for the assembly is caused to shift when the value of the differential pressure varies over a usable operating range, and accordingly an output displacement results which is not proportional to the value of the differential pressure throughout the operating range of differential pressure values.

In the copending application of myself and William E. Baker, Serial No. 416,078, filed March 15, 1954, and assigned to the same assignee as the present invention, there is disclosed differential pressure apparatus wherein the effective displacement axis or center of rotation or pivot remains fixed throughout a useful operating range of differential pressure values. In the aforesaid copending application there is provided by way of example one or more cantilever spring elements in a plane between a pair of interconnected differential pressure bellows preferably located side-by-side. However, there are certain applications where it is necessary to extend the operating range of differential pressure values and yet still maintain the displacement or rotational axis fixed. In this sense the present invention is in the nature of an improvement over the constructions specifically described in the aforesaid copending application, which the copending application containing claims which are generic to the embodiments of the present application.

The present invention is also concerned with the problem of establishing a control or indication characteristic derived from differential pressure response means so that there is obtained a greater sensitivity for one portion of the total operating range of differential pressure values than for another portion of the total range. For example, in certain indicators, it is desirable to employ a dial scale which has an expanded lower or upper range portion.

It is an object of the present invention to provide improved differential pressure responsive apparatus.

It is another object of the invention to provide apparatus capable of accurately translating two pressures into a displacement in accordance with a predetermined desired relationship.

It is another object of the invention to provide apparatus capable of producing a displacement which is a linear function of the difference between two pressures over a relatively wide range of differential pressure values.

It is another object of the invention to provide differential pressure sensitive apparatus which employs flexible diaphragm means but which lends itself to a relatively simple displacement or deflection analysis.

It is another object of the invention to provide differential pressure sensitive apparatus wherein a pair of flexible diaphragm means cooperate with spring means free of cantilever or bending stress when a differential pressure is applied to the diaphragm means.

It is another object of the invention to provide spring means for restraining a pair of rocking diaphragm means and for pivotally supporting an output displacement member, the spring means being adapted to undergo a type of stress which exerts a linear restraining influence upon the angular displacement characteristic of the output member.

It is still another object of the invention to provide differential pressure apparatus utilizing a pair of tiltable or rockable diaphragm means with pure torsion spring means in such a manner that the effective axis about which the diaphragm means rocks, and about which a displaceable output member pivots, does not shift with different differential pressure values.

It is still another object of the invention to provide in combination with a pair of tilting or rocking diaphragm means and associated spring restraining means and displaceable output member, novel zero-adjustment means adapted to permit sensitive initial adjustment of the diaphragm means assembly by requiring a relatively small input displacement in order to obtain a given initial adjustment of the output member.

It is a further object of the invention to provide in association with a pair of tilting or rocking diaphragm means readily replaceable torsion spring restraining means.

It is a further object of the invention to provide differential pressure sensitive apparatus characterized by a greater sensitivity of control or indication in one range of differential pressure values than in another range of differential pressure values.

The above and other objects and advantages of the present invention will appear more fully hereinafter from a consideration of the detailed description which follows, taken in conjunction with the accompanying drawings, wherein specific embodiments of the invention are illustrated by way of example, in which.

Figure 1:
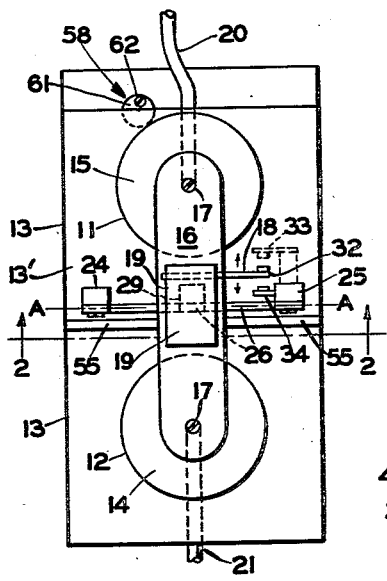
Fig. 1 is a top plan view of one simplified from of differential pressure responsive device according to the invention.
Figure 4:
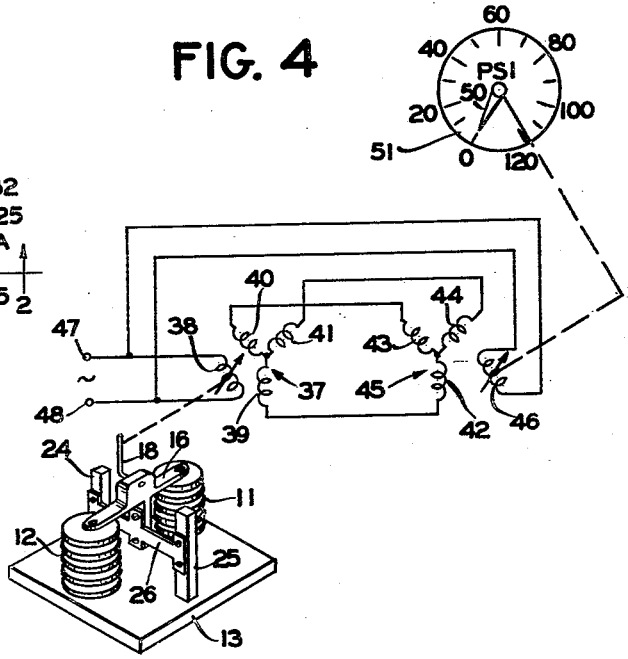
Figure 2:
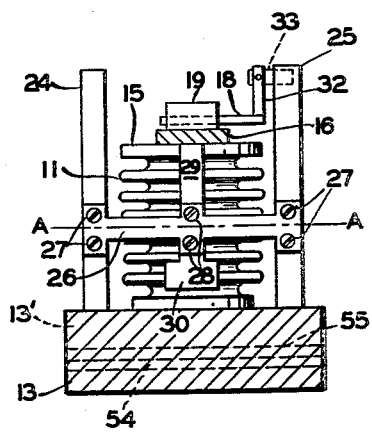
Fig. 2 is a cross-sectional view of the device of Fig. 1 taken along the line 2—2.
Figure 3:
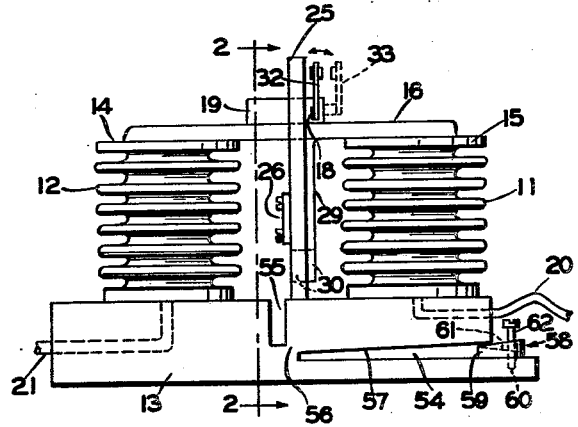
Fig. 3 is a side elevational view of the device of Figs. 1 and 2.
Figure 6:
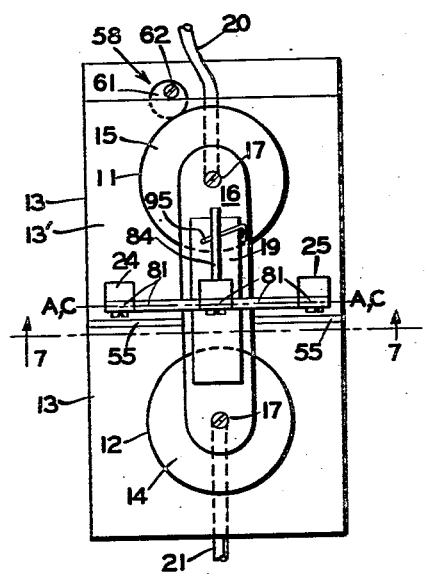
Figure 5:
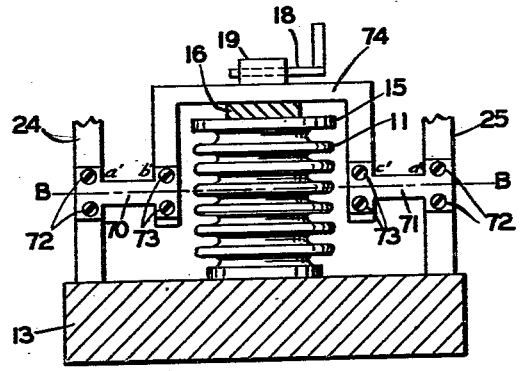
Figure 7:
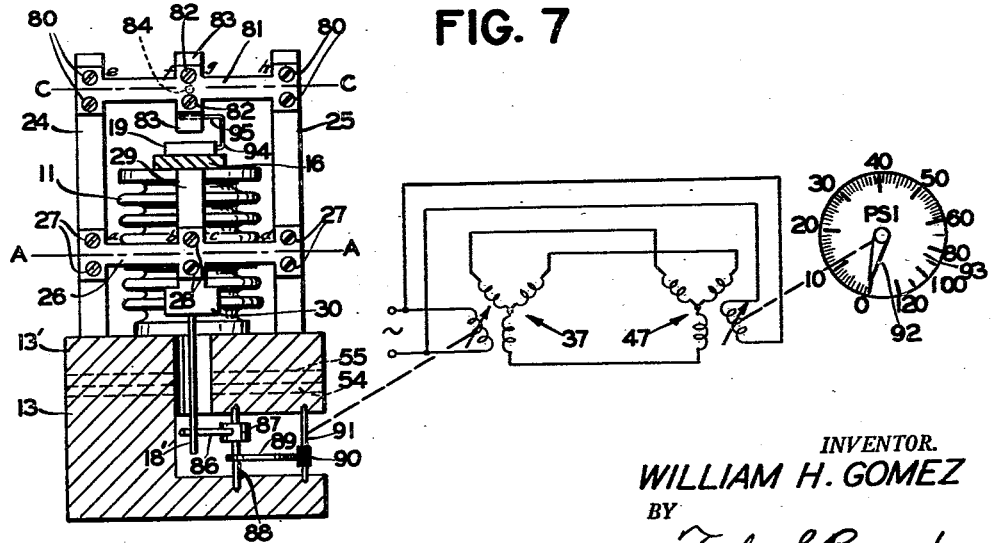

Fig. 4 schematically illustrates remote electrical indicating apparatus controlled by a differential pressure response device of the type illustrated in Figs. 1-3;

Fig. 5 is a cross-sectional view similar to Fig. 2 of a modified form of differential pressure responsive device in accordance with the invention;

Fig. 6 is a top plan view of a differential pressure responsive device adapted to provide greater sensitivity over the lower range of differential pressure values than over the upper range; and Fig. 7 includes a cross-sectional view of the device of Fig. 6 taken along the line 7—7 and also schematically illustrates associated remote indicating apparatus including a dial having an expanded lower range portion to provide expanded indications of differential pressures in the lower range of pressure differential values.

Turning to Figs. 1, 2, and 3 there is provided a pair of identical flexible metal bellows 11 and 12 having their fixed ends secured hermetically to a stationary support or base member 13 composed of a metal such as aluminum, or an aluminum-silicon-copper alloy. The fixed end of bellows 11 is secured to a hinged portion 13' of the base member 13 which will be described in greater detail hereinafter. The movable ends of bellows 11 and 12 are hermetically sealed off by cap members 14 and 15, respectively. A rigid metal cross-member or connecting member 16 has its ends secured by screws 17 respectively to the cap members 14 and 15. A motion take-off or output pin 18 is rigidly secured in a raised central portion 19 of the connecting member 16.

The interior of bellows 11 is supplied with a pressure fluid from a conduit 20 of flexible or pliable material such as copper, while the interior of bellows 12 is supplied with pressure fluid from a conduit 21. One pressure fluid may be a gaseous mixture such as air at ambient or atmospheric pressure and the second pressure fluid may be a gaseous mixture such as air or a liquid, such as oil or fuel, at a different pressure, in which case the output displacement of pin 18 from its zero or initial position will be a function of gauge pressure, that is the difference between the second pressure and the ambient or atmospheric pressure. Alternatively, both pressure fluids may be gases or liquids, in which case the output displacement of pin 18 will simply be a function of the difference between the pressures of the gases or liquids. In certain applications it may be desirable to maintain a vacuum in one of the bellows, in which case the output displacement of pin 18 will be a function of the absolute pressure in the other bellows. The expressions "differential pressure," "difference in pressures" and similar expressions in the specification and claims are to be deemed to include the different variants mentioned above.

Rigidly attached to the hinged portion 13' of base member 13, or integral therewith, are parallel rigid posts 24 and 25. Posts 24 and 25 extend in directions parallel to the longitudinal axes of bellows 11 and 12 and lie substantially in a plane perpendicular to the plane which includes the longitudinal axes of bellows 11 and 12.

A pure torsion spring in the form of a normally flat resilient metal strip or ribbon 26 has ear or flanged portions at its ends rigidly secured by screws 27 to posts 24 and 25, respectively. The longitudinal axis A—A of spring 26 is preferably located midway between the pair of bellows and also midway between the fixed and movable ends of each bellows. Torsion spring 26 has central ear portions rigidly secured by screws 28 to a rigid downwardly depending portion 29 of the cross-member 16 interconnecting bellows 11 and 12. Portion 29 may include a counterweight portion 30. The ear portions of torsion spring 26 are desirable for sturdy attachment but are not essential, and a straight strip or ribbon of resilient material can be employed instead. In either construction the portions of spring 26 which undergo torsional stress in response to differential pressure are the portion between points $a$ and $b$ and the portion between points $c$ and $d$.

Torsion spring 26 may be composed of a suitable resilient material such as clock-spring steel having approximately 0.5% carbon and the balance being iron. Resilient materials having a very high ultimate strength and a very high elastic limit produce especially good results. In one construction the length of the torsion portions of spring 26 between $a$ and $b$ and between $c$ and $d$ was approximately $3/16$ inch with a width of approximately $1/8$ inch and a thickness of approximately 0.025 inch. Spring 26 is made sufficiently wide so that the longitudinal axis A—A of the spring will not bend towards or away from the base member 13 during normal operation. Bellows 11 and 12 may be composed of Phosphor bronze material, for example a composition of approximately 92% copper, 7.5% tin and 0.5% phosphor.

The torsion spring 26 prevents collapse of the bellows if the latter are tensioned and prevents movement of the bellows along their longitudinal axes due to equal changes in the fluid pressures applied to the two bellows. When there is no fluid in either bellows, or when there is equal fluid pressure inside each bellows and the same external pressure so that equal differential pressures exist across each bellows, then the torsion spring 26 is under no stress as shown in Figs. 1–3.

For purposes of simplifying the discussion it will be assumed that both bellows are subjected to the same external pressure and that it is the pressure applied to the interior of one or both of the bellows that varies. In operation when the pressure applied to the interior of one or both of the bellows varies so that there results a net difference between the pressure inside bellows 11 and the pressure inside bellows 12, then the forces exerted by the pair of bellows become unequal. Considering Fig. 3 and assuming that bellows 11 is subjected to the greater internal pressure, then the pair of bellows interconnected by cross-member 16 will rock or pivot with spring 26 in a left-hand or counter-clockwise direction about a pivot axis which coincides with the longitudinal axis A—A of the torsion spring 26 to cause the output pin 18 to pivot about axis A—A until a new equilibrium position is reached where the net fluid pressure force is again balanced by the net spring restraining force.

During such tilting or rocking movement bellows 11 is expanded and bellows 12 is compressed, and the portions of spring 26 between $a$ and $b$ and between $c$ and $d$ are subjected to a shear stress which is pure torsional stress and twist about the fixed pivot or rotational axis A—A with the greatest distortion occurring midway between $a$ and $b$ and midway between $c$ and $d$. Since no bending or cantilever stress is developed in spring 26 and the stress is instead one of pure torsion, spring 26 will exert a linear influence upon the displacement characteristic of the connecting member 16 or the motion take-off pin 18. Accordingly, over a wide range of differential pressure values the angular position or displacement of pin 18, measured with reference to its initial position corresponding to zero differential pressure, will be a linear function of the magnitude of the differential pressure, that is the difference between the pressures applied to bellows 11 and 12. The extent of change in the position of output pin 18 per unit change in the differential pressure will be determined of course by the initial location of pin 18 with respect to axis A—A.

As illustrated, the device of Figs. 1–3 is adapted to perform an electrical switching function. For this purpose a spring contact element 32 has its lower end rigidly attached to the motion take-off pin 18 so as to be displaced in accordance with the displacement of pin 18. Mounted on post 25 are fixed contact elements 33 and 34, represented generally by dotted lines for the sake of clarity. The electrical connections to elements 32—34 are not shown. When the differential pressure is zero or at some other initial value the contacts of element 32 remain out of engagement with the fixed contacts of elements 33 and 34. When the pressure in bellows 11 exceeds that in bellows 12 by a predetermined amount, pin 18 will have been rocked by the bellows assembly to a position where a contact of element 32 engages the contact on element 34 thereby closing the associated circuit which may actuate a warning lamp for example. Similarly, when the pressure in bellows 12 exceeds that in bellows 11 by a predetermined amount, pin 18 will have been rocked by the bellows assembly to a position where a contact of element 32 engages the contact on element 33 thereby closing the associated circuit which may actuate a warning lamp.

The device of Figs. 1–3 may be employed instead as a differential pressure indicator with pin 18 mechanically coupled to a pointer. As illustrated in Fig. 4 the device of Figs. 1–3 serves in an indicating system as a differential pressure transmitter for transmitting electrical intelligence representative of differential pressure to a remote indicator. In Fig. 4 the output pin 18 is coupled through suitable gearing, gear sectors and linkages (not shown) to the rotor of a synchro transmitting device 37 forming part of a conventional self-synchronous follow-up network. The stator windings 39, 40 and 41 are connected "back-to-back" in the usual manner to the corresponding stator windings 42, 43 and 44 of a remote indicator follow-up synchro device 45. The rotor windings 38 and 46 of synchro devices 37 and 45 are connected across a pair of terminals 47, 48 which in turn are connected to a suitable source of alternating current.

The rotor of synchro device 45 is coupled to displace the pointer 50 associated with an indicator dial 51 which is suitably calibrated linearly, and uniformly over the entire scale range, in units corresponding to differential pressure. For example, dial 51 may be calibrated in units of differential pressure directly, in units of gauge pressure or in units of absolute pressure depending upon the manner in which bellows 11 and 12 are utilized as mentioned previously.

In operation, when there are equal pressures in bellows 11 and 12 and output pin 18 has been zero-adjusted to its up-right position, then the rotors of synchro devices 37 and 45 will each be in a null position with respect to the stator windings and the pointer 50 will register a value corresponding to zero differential pressure. When a difference in the two pressures occurs, then the pivotal displacement imparted to pin 18 will cause the rotor of synchro device 37 to be angularly displaced, resulting in an unbalance of the stator voltages which in the usual manner causes the rotor of synchro device 45 to resume angular positional agreement with the rotor of device 37. Pointer 50 in turn will provide an accurate indication corresponding to differential pressure. If it is desired to measure differential pressures which vary in both directions from zero value, then dial 50 may of course be provided with linear calibrations on both sides of the zero differential pressure mark.

The apparatus of Figs. 1–3 may be hermetically sealed in a housing which may be evacuated or may contain air or an inert gas at ambient or atmospheric pressure, the identical bellows 11 and 12 being exposed to the same external pressure surrounding the outside of the corrugations.

The novel initial or zero-adjustment means utilized in the device of Figs. 1–3 will now be described. A transverse tapered slot 54 and a vertical slot 55 are cut in base member 13 and extend the full width of base 13 to provide base portion or adjustable platform 13 which is hinged at portion 56 to the main body portion of base 13. The upper wall 57 defining slot 54 has a gradual slope. A wedge-shaped cam device 58 is provided for raising or lowering platform 13' about the hinge portion 56. Integral with the main body portion 59 of cam device 58 is a pin 60 which is mounted for rotation in a cylindrical recess provided in base 13. Also integral with the body portion 59 is a shank 62 provided with a screw-driver slot at its upper end. The body portion 59 has a spiral surface 61 sloped for cooperation with the sloping surface of tapered slot 57. When cam device 58 is rotated clockwise platform 13' is raised about hinge portion 56, while counter-clockwise rotation of device 58 lowers platform 13' about hinge portion 56. When platform 13' is raised bellows 11 is directly compressed, posts 24 and 25 with spring 26 and cross-member 16 are tilted in a counter-clockwise direction about hinge portion 56 and bellows 12 is accordingly also compressed, the output pin 18 being carried by cross-member 16 to a new position. Similarly, when platform 13' is lowered bellows 11 is directly expanded, posts 24 and 25 with spring 26 and cross-member 16 are tilted in a clockwise direction and bellows 12 is accordingly also expanded, the output pin 18 being carried to a new position. Considering Fig. 3, when platform 13' is raised the axis A—A is shifted downward and to the left while lowering of platform 13' shifts axis A—A upward and to the right. However, as explained previously, once the initial adjustment has been made the location of axis A—A remains fixed with variations in differential pressure during normal operation of the apparatus. It is to be noted that the novel zero-adjustment means just described has the advantage of providing a much more sensitive type of zero adjustment than would be possible if posts 24 and 25 and spring 26 were unaffected and only the bellows were adjusted. In other words, the zero-adjustment means of the present invention requires only a relatively small screwdriver input adjustment to shank 62 in order to obtain a given change in the position of output pin 18.

In Fig. 5 there is shown a modified configuration which permits the pair of bellows to be located closer together since the torsion spring means does not pass directly between the pair of bellows, although the torsion spring means still lies substantially in a plane located between the pair of bellows. Torsion spring 26 in the device of Figs. 1–3 may be replaced by two separate torsion springs positioned end-to-end in the same plane with adjoining ends being secured to the projection 29 of cross-member 16 so that the springs have common torsion axis B—B. Similarly in the construction of Fig. 5 the torsion spring means comprises a pair of identical flat resilient metal strips or ribbons 70 and 71. The outer ear portions of springs 70 and 71 are secured by screws 72 to posts 24 and 25, respectively. The inner ear portions of springs 70 and 71 are secured by screws 73 to the respective legs of a rigid U-shaped yoke member 74 which is secured to the cross-member interconnecting the movable ends of the pair of bellows. The portions of springs 70 and 71 which undergo torsional stress when a differential pressure exists in the bellows are the portions between a' and b' and c' and d'. The operation is similar to that of the device of Figs. 1–3 with axis B—B remaining fixed when differential pressure varies and the displacement of output pin is directly proportional to differential pressure.

In Figs. 6 and 7 there is illustrated differential pressure responsive apparatus in accordance with the invention characterized by a greater sensitivity of response in the lower range of differential pressure values, for example 0–60 p. s. i., than in the upper range of differential pressure values, for example 60–120 p. s. i., thereby making it possible for the observer to obtain an expanded more precise indication of differential pressure when the pointer is positioned in the lower scale range. The basic construction may be similar to that of Figs. 1–3 or 5. Secured respectively to the upper ends of posts 24 and 25 by screws 80 are the ends of a second pure torsion spring in the form of a normally flat resilient metal strip or ribbon 81 which may be identical with torsion spring 26 and has its longitudinal axis C—C parallel to axis A—A. Secured to the central portion of spring 81 by screws 82 is a rigid support member 83 to which is secured a rigid coupling pin 84 extending perpendicularly to the plane which includes axis A—A and axis C—C and lying substantially in the plane which includes the longitudinal axes of bellows 11 and 12.

In the device of Figs. 6 and 7 the motion take-off or output member is located at the bottom of the assembly for convenience and is shown as a vertical pin 18' secured to the counterweight portion 28 of the projection 29 from the cross-member 16. Output pin 18' engages a transverse pin 86 secured to a sleeve 87 on a shaft 88. Shaft 88 is mounted for rotation in suitable bearings in base 13. Shaft 88 is biased by spring means (not shown). When output pin 18' is moved in or out of the plane of the paper in Fig. 7 it causes pin 86 and shaft 88 to rotate in a counterclockwise or clockwise direction, respectively. Mounted for rotation on shaft 88 is a gear sector 89 which meshes with a gear pinion 90 on a shaft 91. In this manner the motion of output pin 18' is communicated to the rotor of synchro transmitter device 37 for transmission to a remote indicator station as previously described in connection with Fig. 4. The rotor of the synchro follow-up device 45 is coupled to rotate a pointer 92 which cooperates with a dial 93 having an expanded lower scale portion corresponding to the lower range of differential pressures. As illustrated in Fig. 7, the dial and pointer may be arranged to indicate gauge pressure, the lower range extending from 0 to 60 p. s. i. with a dial scale spread of 240° and the upper range extending from 60 p. s. i. to 120° with a dial scale spread of only 90°.

Turning again to the bellows and torsion spring assembly of Figs. 6 and 7, there is secured to the raised portion 19 of the cross-member 16 a rigid pick-up pin 94 having a bent free end portion 95 which remains out of engagement with the coupling pin 84 and lies in a plane perpendicular to the plane including axis A—A and axis C—C when zero differential pressure exists between the pair of bellows. For all differential pressure values in the lower range between 0 and 60 p. s. i. the pick-up pin 94 remains out of engagement with the coupling pin 84 and the pickup pin simply rides freely on cross-member 16. Accordingly, the device operates in a manner similar to the device of Figs. 1–3 and 5, with the restraint of just torsion spring 26 being imposed on the bellows assembly as the bellows tilt in response to changes in differential pressure.

However, when the value of the differential (gauge) pressure reaches 60 p. s. i. then the transverse portion 95 of the pick-up pin 94 has been carried by cross-member 16 to a position where it comes into engagement with the coupling pin 84 carried by torsion spring 81. At this point the restraint of torsion spring 81 is also imposed on the bellows assembly in addition to that of torsion spring 26. For all values of differential pressure in the upper range, spring 81 is in a twisted condition about axis C—C and pins 84 and 94 remain in contact with each other so that the cumulative restraint of both torsion springs is imposed on the bellows assembly. Torsion spring 81 develops pure torsional stress and hence exerts a linear influence for all differential pressure values in the upper range. Over the entire range of differential pressure values (0–120 p. s. i.) the axis A—A, about which the bellows rock and pin 18' pivots, remains fixed. It will thus be seen that the change in position of output pin 18' and shaft 91 per unit change in differential pressure is uniformly less in the upper range (60–120 p. s. i.) than in the lower range (0–60 p. s. i.).

Although certain specific embodiments of the invention have been illustrated and described in detail by way of example, it is to be expressly understood that the invention is not limited thereto. For example, although the motion take-off or output pin is shown in Figs. 1–3 as lying in a plane behind the plane of spring 26, the output pin may instead be located so as to lie in the same plane as spring 26, and in Figs. 6 and 7 the output pin 18' may be located in the same plane as the springs 26 and 81. The phrase "a pair of flexible diaphragm means" employed in the specification and claims is to be understood to include not only a pair of flexible bellows but also a pair of aneroids or a pair of diaphragms mounted side-by-side on separate hollow rigid bases defining respective expansible chambers for receiving pressure fluids or evacuation. Moreover, the torsion springs may be resilient rods of circular cross-section rather than rectangular cross-section. Moreover, where desired the torsion spring means may be relocated with respect to the bellows so that the axis, about which the bellows rock and the output member pivots, may be located other than midway between the fixed and movable ends of each bellows or other than midway between the longitudinal axes of the bellows. When reference is made in the specification and claims to the axis of a torsion spring or the axis of torsion spring means, it will be understood that reference is made to the axis about which the torsion spring or torsion spring means tends to twist when exerting its restraint upon movement of the movable portions of the diaphragm means. Specific dimensions, materials and organizations of elements have been given simply by way of example. Various changes may be made in the design and arrangement of elements without departing from the spirit and scope of the invention as defined by the appended claims, as will now be understood by those skilled in the art.

I claim:

1. In apparatus for producing an output displacement which is substantially directly proportional to the difference between two pressures at least one of which is variable with respect to the other, a support structure, a pair of flexible rockable bellows mounted side-by-side having their fixed ends secured to said support structure and each adapted to be subjected to a different one of said pressures, means for rigidly connecting together the movable ends of said pair of bellows, an output member angularly positioned in accordance with the position of said connecting means, torsion spring means fixedly supported by said support structure and lying substantially in a plane which is located between said pair of bellows and which is substantially perpendicular to the plane including the longitudinal axes of said pair of bellows, said torsion spring means including a pair of flat strips of resilient material having longitudinal axes which coincide, the outer ends of each strip being fixedly supported by said support structure and the inner ends of said strips being rigidly coupled to said connecting means to provide a fixed axis about which the assembly of said pair of bellows and said connecting means rocks in response to changes in the value of said pressure difference and about which said connecting means is angularly positioned.

2. Apparatus according to claim 1 wherein said torsion spring means is adapted to undergo pure torsional stress when twisted to exert a linear opposition to the rocking motion of said pair of bellows and said connecting means for varying values of said pressure difference.

3. Apparatus according to claim 1 wherein the longitudinal axis of said torsion spring means is located in a plane substantially midway between the fixed and movable ends of each bellows.

References Cited in the file of this patent

UNITED STATES PATENTS

| 2,340,008 | Matuszak | Jan. 25, 1944 |
| 2,491,998 | Mikina | Dec. 20, 1949 |
| 2,583,914 | Whitaker | Jan. 29, 1952 |
| 2,664,749 | Jones | Jan. 5, 1954 |
| 2,674,121 | Gorman | Apr. 6, 1954 |
| 2,707,001 | Hathaway | Apr. 26, 1955 |